(12) United States Patent
Nozoe et al.

(10) Patent No.: US 9,051,445 B2
(45) Date of Patent: Jun. 9, 2015

(54) MULTI-COMPONENT SPONGE-FORMING LIQUID SILICONE RUBBER COMPOSITION AND SILICONE RUBBER SPONGE MANUFACTURING METHOD

(75) Inventors: Tsugio Nozoe, Chiba (JP); Fumitaka Suto, Awara (JP); Hiroaki Yoshida, Ichihara (JP); Atsushi Sakuma, Ichihara (JP); Yuichi Tsuji, Chiba (JP)

(73) Assignee: DOW CORNING TORAY CO., LTD., Chiyoda-Ku, Tokyo (JP)

( * ) Notice: Subject to any disclaimer, the term of this patent is extended or adjusted under 35 U.S.C. 154(b) by 392 days.

(21) Appl. No.: 13/056,057

(22) PCT Filed: Jul. 30, 2009

(86) PCT No.: PCT/JP2009/063910
§ 371 (c)(1),
(2), (4) Date: Apr. 26, 2011

(87) PCT Pub. No.: WO2010/013847
PCT Pub. Date: Feb. 4, 2010

(65) Prior Publication Data
US 2011/0190410 A1    Aug. 4, 2011

(30) Foreign Application Priority Data

Jul. 31, 2008  (JP) .................... 2008-199039

(51) Int. Cl.
| C08J 9/35 | (2006.01) |
| C08J 9/28 | (2006.01) |
| C08G 77/12 | (2006.01) |
| C08G 77/20 | (2006.01) |
| C08L 83/04 | (2006.01) |

(52) U.S. Cl.
CPC . *C08J 9/28* (2013.01); *C08G 77/12* (2013.01); *C08G 77/20* (2013.01); *C08J 2201/0504* (2013.01); *C08J 2383/04* (2013.01); *C08L 83/04* (2013.01)

(58) Field of Classification Search
CPC .. C08J 9/28; C08J 2201/0504; C08J 2383/04; C08L 83/04; C08G 77/20; C08G 7/12
USPC .............. 521/63, 64, 65, 154; 528/15, 31, 32
See application file for complete search history.

(56) References Cited

U.S. PATENT DOCUMENTS

| 3,284,406 A | 11/1966 | Nelson |
| 3,294,725 A | 12/1966 | Findlay et al. |
| 3,425,967 A | 2/1969 | Modic |
| 3,436,366 A | 4/1969 | Modic |
| 3,989,666 A | 11/1976 | Niemi |
| 4,189,545 A | 2/1980 | Modic |
| 4,221,688 A | 9/1980 | Johnson et al. |
| 4,248,751 A | 2/1981 | Willing |
| 4,391,921 A | 7/1983 | Johnson |
| 4,427,811 A | 1/1984 | Elias et al. |
| 4,472,470 A | 9/1984 | Modic |
| 4,473,667 A | 9/1984 | Sands |
| 4,500,584 A | 2/1985 | Modic |
| 4,529,789 A | 7/1985 | Kroupa |
| 4,535,141 A | 8/1985 | Kroupa |
| 4,555,529 A | 11/1985 | Lee et al. |
| 4,559,369 A | 12/1985 | Bauman et al. |
| 4,572,917 A | 2/1986 | Graiver et al. |
| 4,584,324 A | 4/1986 | Bauman et al. |
| 4,624,900 A | 11/1986 | Fau |
| 4,689,248 A | 8/1987 | Traver et al. |
| 4,741,861 A | 5/1988 | Okada et al. |
| 4,753,978 A | 6/1988 | Jensen |
| 4,788,240 A | 11/1988 | Fujimoto |
| 4,845,164 A | 7/1989 | Gutek |

(Continued)

FOREIGN PATENT DOCUMENTS

| CN | 1802417 A | 7/2006 |
| CN | 101107324 A | 1/2008 |

(Continued)

OTHER PUBLICATIONS

English language abstract for JP 05-070692 extracted from the PAJ database on Sep. 15, 2011, 8 pages.
English language abstract for JP 5209080 extracted from the espacenet.com database on Sep. 16, 2011, 6 pages.
English language abstract and translation for JP 06-207038 extracted from the PAJ database on Aug. 2, 2011, 42 pages.
English language abstract for JP 6287348 extracted from the espacenet.com database on Sep. 16, 2011, 11 pages.
English language abstract and original document not available for JP 7122000. However, see English language equivalent US 5332762.
English language abstract for JP 7247436 extracted from the espacenet.com database on Sep. 16, 2011, 7 pages.
English language abstract and translation for JP 11-130963 extracted from the PAJ database on Sep. 16, 2011, 31 pages.

(Continued)

*Primary Examiner* — Irina S Zemel
(74) *Attorney, Agent, or Firm* — Howard & Howard Attorneys PLLC (57) ABSTRACT

A multipackage sponge-forming liquid silicone rubber composition that characteristically comprises at least (A) an alkenyl-containing polydiorganosiloxane comprising (A1) a polydiorganosiloxane that has alkenyl groups on both molecular chain terminals and that does not contain alkenyl groups in the side chains on the molecular chain, and (A2) a polydiorganosiloxane that has at least two alkenyl groups in the side chains on the molecular chain; (B) an organopolysiloxane that has at least two silicon-bonded hydrogen atoms in each molecule; (C) a mixture comprising water and an inorganic thickener; (D) an emulsifying agent; (E) a hydrosilylation reaction catalyst; and (F) a cure retarder; and is stored as a plurality of separate compositions wherein none of this plurality of separately stored compositions contain both component (A) and component (C), none of this plurality of separately stored compositions contain both component (B) and component (C), and none of this plurality of separately stored compositions contain both component (B) and component (E).

9 Claims, 1 Drawing Sheet

(56) References Cited

U.S. PATENT DOCUMENTS

| | | |
|---|---|---|
| 4,876,805 A | 10/1989 | Peoples |
| 4,882,398 A | 11/1989 | Mbah |
| 4,891,393 A | 1/1990 | Kazuo et al. |
| 5,135,960 A | 8/1992 | Higuchi et al. |
| 5,153,231 A | 10/1992 | Bouquet et al. |
| 5,246,973 A | 9/1993 | Nakamura et al. |
| 5,332,762 A | 7/1994 | Maschberger et al. |
| 5,348,392 A | 9/1994 | Bouquet et al. |
| 5,362,761 A | 11/1994 | Uragami et al. |
| 5,373,078 A | 12/1994 | Juen et al. |
| 5,399,402 A | 3/1995 | Inoue et al. |
| 5,717,010 A | 2/1998 | Ward et al. |
| 5,764,181 A | 6/1998 | Fey et al. |
| 5,827,921 A | 10/1998 | Osawa et al. |
| 5,908,878 A | 6/1999 | Baity et al. |
| 5,977,226 A | 11/1999 | Dent et al. |
| 6,084,002 A | 7/2000 | Nicholson et al. |
| 6,124,407 A | 9/2000 | Lee et al. |
| 6,262,170 B1 | 7/2001 | Kilgour et al. |
| 7,459,213 B2 | 12/2008 | Yamamoto et al. |
| 7,521,813 B2 | 4/2009 | Kashiwagi et al. |
| 7,683,125 B2 | 3/2010 | Shirasaki et al. |
| 7,687,563 B2 | 3/2010 | Shirasaki et al. |
| 7,732,519 B2 | 6/2010 | Shirasaki et al. |
| 7,767,754 B2 | 8/2010 | Zhu et al. |
| 8,227,520 B2 | 7/2012 | Shirasaki et al. |
| 2004/0152825 A1 | 8/2004 | Yamamoto et al. |
| 2005/0006794 A1 | 1/2005 | Kashiwagi et al. |
| 2006/0264583 A1 | 11/2006 | Kashiwagi et al. |
| 2006/0293445 A1 | 12/2006 | Araki et al. |
| 2007/0015868 A1 | 1/2007 | Shirasaki et al. |
| 2007/0099007 A1 | 5/2007 | Benayoun et al. |
| 2007/0123828 A1 | 5/2007 | Propp |
| 2007/0129508 A1 | 6/2007 | Kashiwagi |
| 2008/0021125 A1 | 1/2008 | Shirasaki et al. |
| 2008/0160322 A1 | 7/2008 | Mochizuki et al. |
| 2009/0118441 A1 | 5/2009 | Yamamoto et al. |
| 2009/0263936 A1 | 10/2009 | Fujisawa et al. |
| 2009/0292056 A1 | 11/2009 | Shirasaki et al. |
| 2010/0197870 A1 | 8/2010 | Kashiwagi et al. |
| 2011/0021649 A1 | 1/2011 | Sakuma et al. |
| 2011/0077344 A1 | 3/2011 | Hasegawa et al. |
| 2011/0190410 A1 | 8/2011 | Nozoe et al. |
| 2011/0281123 A1 | 11/2011 | Yoshida et al. |
| 2011/0288246 A1 | 11/2011 | Hasegawa et al. |
| 2011/0294950 A1 | 12/2011 | Hasegawa et al. |

FOREIGN PATENT DOCUMENTS

| | | |
|---|---|---|
| EP | 0240162 A2 | 10/1987 |
| EP | 0522585 A1 | 1/1993 |
| EP | 0636662 A2 | 2/1995 |
| EP | 0997498 A1 | 5/2000 |
| EP | 1627900 A1 | 2/2006 |
| EP | 1724308 A1 | 11/2006 |
| JP | 54135865 A | 10/1979 |
| JP | 59012830 A | 1/1984 |
| JP | 59012832 A | 1/1984 |
| JP | 61103945 A | 5/1986 |
| JP | 61108640 A | 5/1986 |
| JP | 02-151660 A | 6/1990 |
| JP | 05-070692 | 3/1993 |
| JP | 5209080 A | 8/1993 |
| JP | 06-207038 | 7/1994 |
| JP | 6287348 A | 10/1994 |
| JP | 07-041679 | 2/1995 |
| JP | 07-053872 A | 2/1995 |
| JP | 7247436 A | 9/1995 |
| JP | 7122000 B | 12/1995 |
| JP | 11-130963 | 5/1999 |
| JP | 11-236508 | 8/1999 |
| JP | 2000-129132 A | 5/2000 |
| JP | 2001-164187 A | 6/2001 |
| JP | 2002-114860 | 4/2002 |
| JP | 2003-012925 A | 1/2003 |
| JP | 2003-096223 | 4/2003 |
| JP | 2004-091569 | 3/2004 |
| JP | 2004-143332 | 5/2004 |
| JP | 2004-346248 | 12/2004 |
| JP | 2005042099 A | 2/2005 |
| JP | 2005-062534 | 3/2005 |
| JP | 2005-161132 A | 6/2005 |
| JP | 2005-255968 | 9/2005 |
| JP | 2006-335857 A | 12/2006 |
| JP | 2006/350634 A | 12/2006 |
| JP | 2006328102 A | 12/2006 |
| JP | 2007-131694 A | 5/2007 |
| JP | 2008-163060 | 7/2008 |
| JP | 2008214625 A | 9/2008 |
| JP | 2010-018662 A | 1/2010 |
| WO | WO 03102063 A2 | 12/2003 |
| WO | WO 2004074378 A1 | 9/2004 |
| WO | WO 2004/104105 A1 | 12/2004 |
| WO | WO 2005085357 A1 | 9/2005 |
| WO | WO 2007/055395 A1 | 5/2007 |
| WO | WO 2008/096882 A1 | 8/2008 |
| WO | WO 2010/013847 A1 | 2/2010 |
| WO | WO 2010/087522 A1 | 8/2010 |
| WO | WO 2010/087523 A1 | 8/2010 |
| WO | WO 2010/087525 A1 | 8/2010 |

OTHER PUBLICATIONS

English language abstract and translation for JP 11-236508 extracted from the PAJ database on Aug. 2, 2011, 37 pages.

English language abstract not available for JP 54135865. However, see English language equivalent US 4189545. Foreign document extracted from the espacenet.com database on Sep. 16, 2011, 13 pages.

English language abstract not available for JP 59012830. However, see English language equivalent US 4473667. Foreign document extracted from the espacenet.com database on Sep. 16, 2011, 9 pages.

English language abstract not available for JP 59012832. However, see English language equivalent US 439121. Foreign document extracted from the espacenet.com database on Sep. 16, 2011, 8 pages.

English language abstract not available for JP 61108640. However, see English language equivalent US 4559369. Foreign document extracted from the espacenet.com database on Sep. 16, 2011, 14 pages.

English language abstract not available for JP 61103945. However, see English language equivalent US 4572917. Foreign document extracted from the espacenet.com database on Sep. 16, 2011, 12 pages.

English language abstract and translation for JP 2002-114860 extracted from the PAJ database on Aug. 2, 2011, 50 pages.

English language abstract and translation for JP 2003-096223 extracted from the PAJ database on Aug. 2, 2011, 45 pages.

English language abstract and translation for JP 2004-091569 extracted from the PAJ database on Sep. 16, 2011, 29 pages.

English language abstract and translation for JP 2004-143332 extracted from the PAJ database on Aug. 2, 2011, 39 pages.

English language abstract and translation for JP 2004-346248 extracted from the PAJ database on Aug. 2, 2011, 35 pages.

English language abstract and translation for JP 2005-062534 extracted from the PAJ database on Aug. 2, 2011, 40 pages.

English language abstract and translation for JP 2005-255968 extracted from the PAJ database on Aug. 2, 2011, 44 pages.

English language abstract and translation for JP 2008-163060 extracted from the PAJ database on Aug. 2, 2011, 52 pages.

English language abstract for JP 2008214625 extracted from the espacenet.com database on Aug. 2, 2011, 16 pages.

English language abstract for WO 2004074378 extracted from the espacenet.com database on Sep. 16, 2011, 32 pages.

English language abstract for WO 2005085357 extracted from the espacenet.com database on Aug. 2, 2011, 32 pages.

International Search Report for Application No. PCT/JP2004/002883 dated Jul. 6, 2004, 4 pages.

International Search Report for Application No. PCT/JP2008/052203 dated May 16, 2008, 2 pages.

(56) References Cited

OTHER PUBLICATIONS

International Search Report for Application No. PCT/JP2009/063910 dated Dec. 15, 2009, 5 pages.
English language abstract for JP 2005042099 extracted from the espacenet.com database on Mar. 11, 2013, 35 pages.
English language abstract for JP 2006328102 extracted from the espacenet.com database on Mar. 11, 2013, 17 pages.
English language abstract and machine-assisted English translation for JP 2006-335857 extracted from the PAJ database on Mar. 11, 2013, 34 pages.
English language abstract and machine-assisted English translation for JP 2007-131694 extracted from the PAJ database on Mar. 12, 2013, 32 pages.
International Search Report for Application No. PCT/JP2008/064080 dated Dec. 22, 2008, 3 pages.
English language abstract and machine-assisted English translation for WO 03102063 extracted from the espacenet.com database on Mar. 12, 2013, 36 pages.
English language abstract and translation for JP 07-041679 extracted from the PAJ database on Aug. 26, 2011, 29 pages.
International Search Report for Application No. PCT/JP2010/051660 dated Jun. 2, 2010, 3 pages.
International Search Report for Application No. PCT/JP2010/051661 dated Jun. 2, 2010, 3 pages.
International Search Report for Application No. PCT/JP2010/051663 dated Jun. 2, 2010, 3 pages.
English language abstract for CN 101107324 extracted from the espacenet.com database on Oct. 26, 2012, 8 pages.
English language abstract for JP 02-151660 extracted from the espacenet.com database on Oct. 18, 2012, 19 pages.
English language abstract not available for CN 1802417; however, see English language equivalent US 2009/0292056. Orginal document extracted from the espacenet.com database on Oct. 28, 2013, 17 pages.
English language abstract and machine-assisted English translation for JP 07-053872 extracted from the PAJ database on Oct. 14, 2013, 34 pages.
English language abstract and machine-assisted English translation for JP 2000-129132 extracted from the PAJ database on Oct. 14, 2013, 45 pages.
English language abstract and machine-assisted English translation for JP 2001-164187 extracted from the PAJ database on Oct. 14, 2013, 34 pages.
English language abstract and machine-assisted English translation for JP 2003-012925 extracted from the PAJ database on Oct. 16, 2013, 26 pages.
English language abstract and machine-assisted English translation for JP 2005-161132 extracted from the PAJ database on Oct. 14, 2013, 49 pages.
English language abstract and machine-assisted translation for JP 2006/350634 extracted from the PAJ database on Oct. 28, 2013, 109 pages.
English language abstract and machine-assisted English translation for JP 2010-018662 extracted from the PAJ database on Oct. 16, 2013, 40 pages.
English language abstract for WO 2004/104105 extracted from the espacenet.com database on Oct. 28, 2013, 28 pages.
English language abstract for WO 2010/013847 extracted from the espacenet.com database on Sep. 16, 2011, 42 pages.

MULTI-COMPONENT SPONGE-FORMING LIQUID SILICONE RUBBER COMPOSITION AND SILICONE RUBBER SPONGE MANUFACTURING METHOD

RELATED APPLICATIONS

This application claims priority to and all the advantages of International Patent Application No. PCT/JP2009/063910, filed on Jul. 30, 2009, which claims priority to Japanese Patent Application No. JP2008-199038, filed on Jul. 31, 2008.

TECHNICAL FIELD

The present invention relates to a multipackage sponge-forming liquid silicone rubber composition comprising a plurality of separately stored compositions and also relates to a method of producing a silicone rubber sponge.

BACKGROUND ART

Silicone rubber sponge exhibits an excellent heat resistance and an excellent weathering resistance, is light weight, and also has a low thermal conductivity and as a consequence is used for automotive parts and components, rolls and belts for image-forming equipment such as copiers, printers, and so forth, and various sealing products. Silicone rubber compositions that incorporate a heat-degradable organic blowing agent or any of various volatile components have heretofore been used to produce silicone rubber sponge, but it has been difficult to use these compositions in mold-based molding and they have a poor capacity to reproduce the shape of a mold cavity.

An addition reaction-curing, silicone rubber sponge-forming composition for fixing roller service is described in JP 2005-062534 A; this composition contains water and a surfactant. However, since it is quite difficult to bring about a uniform and stable dispersion of water in silicone rubber compositions, the described composition is difficult to prepare and the resulting composition also has a poor storage stability.

The silicone rubber sponge-forming composition described in JP 2002-114860 A incorporates a hydrated water-absorptive polymer in a hydrosilylation reaction-crosslinking silicone rubber composition. An emulsion composition for the formation of silicone rubber sponge is described in WO 2005/085357; this emulsion composition comprises a hydrosilylation reaction-crosslinking silicone rubber composition, an aqueous solution of a water-soluble polymer, and an emulsifying agent. These sponge-forming compositions can form a silicone rubber sponge through the formation of a water-containing silicone rubber molding by curing•crosslinking under the application of, for example, heat, followed by removal of the water by the application of, for example, heat, to yield the silicone rubber sponge. However, these sponge-forming compositions have exhibited problems caused by the incorporated polymer, i.e., the appearance of mold staining during molding, a deterioration in the heat resistance of the resulting sponge, and the occurrence of defects in appearance. The fineness of the obtained sponge cells has also been unsatisfactory.

An emulsion composition for the formation of silicone rubber is described in JP 2004-346248 A; this emulsion composition comprises a hydrosilylation reaction-crosslinking silicone rubber composition, water that contains a smectite clay, and an emulsifying agent. However, the sponge moldings obtained with this composition have a large shrinkage rate and this composition also has a poor capacity to reproduce the mold cavity shape; moreover, the fineness and uniformity of the obtained sponge cells are also unsatisfactory.

DISCLOSURE OF THE INVENTION

Due to the low compatibility between water and organopolysiloxane, the water readily separates from water-containing organopolysiloxane compositions and care must therefore be exercised in their handling. In addition, it has been difficult to achieve high water contents because the dispersion of the water in the composition may then become nonuniform and the storage stability may deteriorate, and, for example, silicone rubber sponge having a density of 0.55 g/cm$^3$ or less has also been quite difficult to obtain.

An object of the present invention is to provide a multipackage sponge-forming liquid silicone rubber composition that has an excellent storage stability and that can form a sponge that exhibits a low shrinkage rate during sponge molding, is free of bleed out by uncrosslinked components, and has microfine, uniform, and continuous cells. A further object of the present invention is to provide a method of producing a silicone rubber sponge using a multipackage sponge-forming liquid silicone rubber composition.

The multipackage sponge-forming liquid silicone rubber composition of the present invention characteristically comprises at least (A) 100 mass parts of an alkenyl-containing polydiorganosiloxane comprising
  (A1) 0 to 90 mass parts of a polydiorganosiloxane that has alkenyl groups on both molecular chain terminals and that does not contain alkenyl groups in the side chains on the molecular chain, and
  (A2) 10 to 100 mass parts of a polydiorganosiloxane that has at least two alkenyl groups in the side chains on the molecular chain;
(B) an organopolysiloxane that has at least two silicon-bonded hydrogen atoms in each molecule, in an amount that provides 0.4 to 20 moles silicon-bonded hydrogen atoms in component (B) per 1 mole of the alkenyl groups in component (A);
(C) 10 to 250 mass parts of a mixture comprising water and an inorganic thickener;
(D) 0.1 to 15 mass parts of an emulsifying agent;
(E) a hydrosilylation reaction catalyst in an amount sufficient to bring about crosslinking of this composition; and
(F) 0.001 to 5 mass parts of a cure retarder, and is stored as a plurality of separate compositions wherein none of this plurality of separately stored compositions contain both component (A) and component (C), none of this plurality of separately stored compositions contain both component (B) and component (C), and none of this plurality of separately stored compositions contain both component (B) and component (E).

The aforementioned multipackage sponge-forming liquid silicone rubber composition preferably further contains (G) a finely divided silica powder at not more than 20 mass parts per 100 mass parts component (A).

The aforementioned component (C) preferably is a mixture of water and a smectite clay. This smectite clay is preferably a hydrophilic composite comprising a smectite clay and an anionic polymer. The molar ratio of the silicon-bonded hydrogen atoms in component (B) per 1 mole of the silicon-bonded alkenyl in component (A) is preferably in the range of 1.5 to 20. The aforementioned component (E) is preferably a finely particulate platinum-type catalyst comprising a platinum-type catalyst dispersed in a thermoplastic resin.

The multipackage sponge-forming liquid silicone rubber composition of the present invention can be exemplified by a three-package sponge-forming liquid silicone rubber composition comprising (I) a separately stored composition that comprises components (A), (E), and (G), but which does not contain component (B) and does not contain component (C); (II) a separately stored composition that comprises components (A), (B), (D), (F), and (G), but which does not contain component (C) and does not contain component (E); and (III) a separately stored composition that comprises component (C), but which does not contain component (A) and does not contain component (B). The multipackage sponge-forming liquid silicone rubber composition of the present invention can also be exemplified by a three-package sponge-forming liquid silicone rubber composition comprising (I) a separately stored composition that comprises components (A), (E), and (G), but which does not contain component (B) and does not contain component (C); (II) a separately stored composition that comprises components (A), (B), (F), and (G), but which does not contain component (C) and does not contain component (E); and (III) a separately stored composition that comprises components (C) and (D), but which does not contain component (A) and does not contain component (B). The multipackage sponge-forming liquid silicone rubber composition of the present invention can be further exemplified by a three-package sponge-forming liquid silicone rubber composition comprising (I) a separately stored composition that comprises components (A), (D), (E), and (G), but which does not contain component (B) and does not contain component (C); (II) a separately stored composition that comprises components (A), (B), (D), (F), and (G), but which does not contain component (C) and does not contain component (E); and (III) a separately stored composition that comprises component (C), but which does not contain component (A) and does not contain component (B).

The method of the present invention of producing a silicone rubber sponge characteristically comprises the following steps 1, 2, and 3.

Step 1: A step of mixing a plurality of separately stored compositions of a multipackage sponge-forming liquid silicone rubber composition to produce a sponge-forming liquid silicone rubber composition comprising at least the following components (A) to (F), wherein none of this plurality of separately stored compositions contain both component (A) and component (C), none of this plurality of separately stored compositions contain both component (B) and component (C), and none of this plurality of separately stored compositions contain both component (B) and component (E):

(A) 100 mass parts of an alkenyl-containing polydiorganosiloxane comprising
  (A1) 0 to 90 mass parts of a polydiorganosiloxane that has alkenyl groups on both molecular chain terminals and that does not contain alkenyl groups in the side chains on the molecular chain, and
  (A2) 10 to 100 mass parts of a polydiorganosiloxane that has at least two alkenyl groups in the side chains on the molecular chain;
(B) an organopolysiloxane that has at least two silicon-bonded hydrogen atoms in each molecule, in an amount that provides 0.4 to 20 moles silicon-bonded hydrogen atoms in component (B) per 1 mole of the alkenyl groups in component (A);
(C) 10 to 250 mass parts of a mixture comprising water and an inorganic thickener;
(D) 0.1 to 15 mass parts of an emulsifying agent;
(E) a hydrosilylation reaction catalyst in an amount sufficient to bring about crosslinking of this composition; and
(F) 0.001 to 5 mass parts of a cure retarder.

Step 2: A step of crosslinking and curing the sponge-forming liquid silicone rubber composition obtained in step 1 to obtain a water-containing silicone rubber molding.

Step 3: A step of removing the water from the water-containing silicone rubber molding obtained in step 2 to obtain a silicone rubber sponge.

The silicone rubber sponge described in the preceding is well suited for use as an elastic material for a fixing member in an image-forming apparatus, and this fixing member is preferably a roller or a belt.

The multipackage sponge-forming liquid silicone rubber composition of the present invention characteristically crosslinks and cures to form a silicone rubber sponge that has microfine-sized, uniform, and continuous cells and that has a small shrinkage rate. In addition, because it is free of bleed out by noncrosslinked component during molding, the multipackage sponge-forming liquid silicone rubber composition of the present invention characteristically inhibits the occurrence of mold staining and appearance defects. Because the mixture of water and an inorganic thickening agent is stored separately from the polydiorganosiloxane base component, the multipackage sponge-forming liquid silicone rubber composition of the present invention characteristically is free of the risk that the water will undergo separation and therefore has an excellent storage stability and makes possible the production of silicone rubber sponge with smaller densities and makes it possible to vary the density of the obtained silicone rubber sponge according to the particular objective. The method of the present invention for producing a silicone rubber sponge characteristically can efficiently produce a silicone rubber sponge that has microfine-sized, uniform, and continuous cells and makes possible the production of silicone rubber sponge with smaller densities and enables the facile variation of the density of the obtained silicone rubber sponge according to the particular objective. In addition, this silicone rubber sponge characteristically has microfine-sized, uniform, and continuous cells.

BEST MODE FOR CARRYING OUT THE INVENTION

The multipackage sponge-forming liquid silicone rubber composition of the present invention will be described in detail in the following.

Component (A) is the base component of the silicone rubber composition of the present invention and is alkenyl group-containing polydiorganosiloxane that has silicon-bonded alkenyl in each molecule. Component (A) comprises (A1) a polydiorganosiloxane that has alkenyl groups on both molecular chain terminals and that does not contain alkenyl groups in the side chains on the molecular chain and (A2) a polydiorganosiloxane that has at least two alkenyl groups in the side chains on the molecular chain. The component (A1): component (A2) blending ratio is in the range of (A1):(A2)=0:100 to 90:10 and preferably is in the range of (A1):(A2)=0:100 to 75:25 and more preferably is in the range of (A1):(A2)=10:90 to 50:50. The use of component (A1) in combination with component (A2) provides a substantial improvement in the shrinkage rate of the silicone rubber sponge formed from the multipackage sponge-forming liquid silicone rubber composition of the present invention.

Component (A1), which is a polydiorganosiloxane that has alkenyl groups on both molecular chain terminals and that does not contain alkenyl groups in the side chains on the molecular chain, preferably has a viscosity at 25° C. of 0.1 to 100 Pa·s and more preferably of 0.1 to 40 Pa·s. A very small amount of the molecular chain terminals in the component (A1) polydiorganosiloxane may be replaced by the hydroxyl group or by a non-alkenyl organic group. The siloxane backbone of the component (A1) organopolysiloxane may be straight chain or branched chain or may be a mixture of straight chain and branched chain, but a substantially straight-chain polydiorganosiloxane is preferred in which the main chain is formed by diorganosiloxane unit repetition and both molecular chain terminals are endblocked by an alkenyldiorganosiloxy group.

The alkenyl group in component (A1) can be exemplified by vinyl, allyl, propenyl, isopropenyl, butenyl, isobutenyl, pentenyl, hexenyl, heptenyl, and so forth, wherein vinyl is preferred. The non-alkenyl silicon-bonded organic group in component (A1) can be exemplified by generally $C_{1-10}$ and preferably $C_{1-8}$ unsubstituted or substituted monovalent hydrocarbyl groups such as alkyl, e.g., methyl, ethyl, propyl, butyl, pentyl, hexyl, and so forth; cycloalkyl such as cyclopentyl, cyclohexyl, and so forth; aryl such as phenyl, tolyl, xylyl, naphthyl, and so forth; aralkyl such as benzyl, phenethyl, and so forth; and halogenated alkyl such as 3,3,3-trifluoropropyl, 3-chloropropyl, and so forth; wherein methyl is preferred.

Component (A2), which is a polydiorganosiloxane that has at least two alkenyl groups in the side chains on the molecular chain, has a viscosity at 25° C. preferably of 0.1 to 100 Pa·s and more preferably of 0.1 to 40 Pa·s. The alkenyl in component (A2) may be present in molecular chain terminal position in addition to its presence in the side chains on the molecular chain. A small amount of the molecular chain terminals in the component (A2) polydiorganosiloxane may be substituted by, for example, the hydroxyl group. The siloxane backbone of the component (A2) organopolysiloxane may be straight chain or branched chain or may be a mixture of straight chain and branched chain, but a substantially straight-chain polydiorganosiloxane is preferred in which the main chain is formed by diorganosiloxane unit repetition and both molecular chain terminals are endblocked by an alkenyldiorganosiloxy group and or an alkenyl-free triorganosiloxy group.

The alkenyl in component (A2) can be exemplified as for component (A1) above. In addition, the non-alkenyl silicon-bonded organic groups in component (A2) can also be exemplified as for component (A1) above.

Component (B) is an organopolysiloxane that has at least two silicon-bonded hydrogen atoms in each molecule, and is a crosslinking agent for the multipackage sponge-forming liquid silicone rubber composition of the present invention. The silicon-bonded hydrogen may be located in a terminal siloxane unit and/or in a siloxane unit in the polymer chain. This organopolysiloxane is preferably a straight-chain siloxane polymer and contains the $RHSiO_{2/2}$ unit and/or the $R_2XSiO_{1/2}$ unit as an essential unit or essential units in the molecule and may contain the $R_2SiO_{2/2}$ unit on an optional basis, wherein R in these formulas is a $C_{1-10}$ and preferably $C_{1-8}$ unsubstituted or substituted monovalent hydrocarbyl group as described for the non-alkenyl organic group in component (A) above and preferably is methyl and X represents the hydrogen atom or R.

The total number of moles of silicon-bonded hydrogen, i.e., the SiH group, present in component (B) is preferably 0.4 to 20 and more preferably 1.5 to 5.0 per 1 mole of the alkenyl groups in component (A). Accordingly, the corresponding quantity of component (B) per 100 mass parts component (A) is preferably selected as appropriate from the range of, for example, 1 to 1000 mass parts, so as to maintain this relationship.

Component (C), a mixture comprising water and an inorganic thickener, serves to generate porosity in the silicone rubber provided by the crosslinking and curing of the multipackage sponge-forming liquid silicone rubber composition of the present invention, i.e., it makes this silicone rubber into a silicone rubber sponge. The quantity of incorporation of component (C) is, expressed per 100 mass parts of component (A), 10 to 250 mass parts, preferably 20 to 200 mass parts, and more preferably 40 to 150 mass parts. When the quantity of component (C) incorporation is less than 10 mass parts, it becomes difficult to generate porosity in the silicone rubber provided by the crosslinking and curing of the multipackage sponge-forming liquid silicone rubber composition of the present invention, i.e., it becomes difficult to make this silicone rubber a silicone rubber sponge. The strength of the resulting silicone rubber sponge is impaired at above 250 mass parts.

The water in component (C), through its removal from the cured product after the crosslinking and curing of the multipackage sponge-forming liquid silicone rubber composition of the present invention, serves to generate porosity in the silicone rubber, i.e., functions to make the silicone rubber a silicone rubber sponge. There are no particular limitations on the type of water in component (C) as long as this water is pure. This water can be exemplified by tap water, well water, ion-exchanged water, distilled water, and so forth. The water in component (C) is preferably ion-exchanged water from the standpoint of providing a stable dispersion of component (C) in component (A).

The thickener in component (C) is a natural or synthetic inorganic thickener and through its mixture with the water raises the viscosity of component (C) and thereby facilitates the dispersion of component (C) in component (A), and it is therefore incorporated in order to bring about a stable state of dispersion by component (C) in component (A). This thickener can be specifically exemplified by natural and synthetic smectite clays, such as bentonite, for which the main component is a clay mineral such as montmorillonite, hectorite, saponite, sauconite, beidellite, nontronite, and so forth, and by hydrophilic composites comprising, e.g., such a smectite clay and an anionic polymer such as a polyacrylic acid. Its quantity of incorporation, expressed per 100 mass parts of the water in component (C), is preferably 0.1 to 10 mass parts and more preferably 0.5 to 5 mass parts.

Smectite clays such as bentonite (montmorillonite), hectorite clay, saponite clay, and so forth, are preferred among the preceding. This is because they provide a large viscosity increase when dispersed in the water and can lower the quantity of use of the emulsifying agent (D), vide infra. This smectite clay can be acquired commercially, for example, as Sumecton (registered trademark, from Kunimine Industries Co., Ltd.) and Lucentite (registered trademark, from Co-op Chemical Co., Ltd.), which are hydrothermal synthesis products, and as Kunipia (registered trademark, from Kunimine Industries Co., Ltd.), Bengel (registered trademark, from Hojun Co., Ltd.), Bentone (registered trademark, from Elementis plc), and Veegum (registered trademark, from R. T. Vanderbilt Company, Inc.), which are purified natural products. The pH of these smectite clays is preferably 5.0 to 9.0 from the standpoint of maintaining the heat resistance of the silicone rubber sponge.

The heretofore known emulsifying agents can be used as the emulsifying agent (D), and this emulsifying agent (D) may be an anionic type, cationic type, zwitterionic type, or nonionic type. The emulsifying agent (D) can be specifically exemplified by nonionic surfactants such as glycerol/fatty acid esters, polyglycerol fatty acid esters, sorbitan fatty acid esters, sucrose fatty acid esters, polyethylene glycol fatty acid esters, polypropylene glycol fatty acid esters, polyoxyethylene glycerol fatty acid esters, polyoxyethylene sorbitan fatty acid esters, polyoxyethylene•polyoxypropylene block copolymers, polyoxyethylene alkyl ethers, polyoxyethylene alkylphenyl ethers, and polyoxyethylene fatty acid amides; nonionic surfactants comprising an organopolysiloxane, such as a polysiloxane•polyoxyethylene graft copolymer; cationic surfactants such as aliphatic amine salts, quaternary ammonium salts, and alkylpyridinium salts; anionic surfactants such as higher fatty acid salts, higher alcohol sulfate ester salts, alkylbenzenesulfonate salts, alkylnaphthalenesulfonate salts, and polyethylene glycol sulfate ester salts; and zwitterionic surfactants such as carboxybetaine types and glycine types. Nonionic surfactants are preferred among the preceding because they have little influence on the hydrosilylation reaction catalyzed by component (E), vide infra.

A single one of these emulsifying agents may be used or two or more may be used in combination. The HLB value of the emulsifying agent, or the weight-average HLB value when two or more emulsifying agents are used in combination, is preferably at least 1 but not more than 10, more preferably is at least 1.5 but less than 6, and particularly preferably is at least 3.5 but less than 6. The quantity of emulsifying agent (D) incorporation, expressed per 100 mass parts of component (A), is 0.1 to 15 mass parts and preferably 0.2 to 3 mass parts.

The hydrosilylation reaction catalyst (E) is preferably, for example, at least one catalyst selected from platinum catalysts, palladium catalysts, and rhodium catalysts, and can be more specifically exemplified by platinum catalysts such as chloroplatinic acid, alcohol-modified chloroplatinic acid, coordination compounds between chloroplatinic acid and an olefin or a vinylsiloxane or an acetylenic compound, and finely particulate platinum catalysts provided by dispersing the preceding in a thermoplastic resin; tetrakis(triphenylphosphine)palladium; chlorotris(triphenylphosphine)rhodium; and so forth. Platinum catalysts are particularly preferred, among which finely particulate platinum catalysts provided by dispersing a platinum catalyst in a thermoplastic resin are preferred from the standpoint of preventing the unwanted cure of the composition in the mixing apparatus. Component (E) is incorporated in an amount effective for its operation as a catalyst, i.e., in a so-called catalytic amount, and in specific terms is incorporated, for example, at the rate of about 0.01 to 500 ppm and preferably about 0.1 to 100 ppm as the mass of the catalyst as the metal element component with reference to the total quantity of components (A) and (B).

With reference to the finely particulate platinum catalysts provided by dispersing a platinum catalyst in a thermoplastic resin, such a finely particulate platinum catalyst preferably contains at least 0.01 weight %, as platinum metal atoms, of the platinum catalyst, preferably comprises a thermoplastic resin that has a softening point of 40 to 200° C. and more preferably 50 to 100° C., and preferably has an average particle size of 0.01 to 500 μm. The thermoplastic resin can be exemplified by thermoplastic silicone resins that exhibit a softening point, that have the siloxane unit represented by the formula $C_6H_5SiO_{3/2}$ as the main component, and that may also contain the siloxane unit represented by the formula $(C_6H_5)_2SiO_{2/2}$, the siloxane unit represented by the formula $CH_3SiO_{3/2}$, the siloxane unit represented by the formula $(CH_3)_2SiO_{2/2}$, the siloxane unit represented by the formula $CH_3(CH_2=CH)SiO_{2/2}$, the siloxane unit represented by the formula $CH_3(C_6H_5)SiO_{2/2}$, and the siloxane unit represented by the formula $(CH_3)_3SiO_{1/2}$; acrylic resins; polycarbonate resins; polystyrene resins; methyl cellulose resins; polysilane resins; nylon resins; polyester resins; and polypropylene resins. The softening point of these thermoplastic resins is determined by observation with a microscope of resin softening on a hot plate that can raise the temperature at a constant prescribed rate.

A finely particulate platinum catalyst comprising a platinum catalyst dispersed in a thermoplastic resin can be produced, for example, by mixing the platinum catalyst and thermoplastic resin to homogeneity in a solvent and then subjecting this mixture to a gas-phase drying in which gas-phase particulation is carried out using, for example, a spray dryer.

The cure retarder (F) adjusts the cure rate and/or the processable use time of the multipackage sponge-forming liquid silicone rubber composition of the present invention and can be specifically exemplified by alcohol derivatives that have a carbon-carbon triple bond, e.g., 3-methyl-1-butyn-3-ol, 3,5-dimethyl-1-hexyn-3-ol, phenylbutynol, 1-ethynyl-1-cyclohexanol, and so forth; ene-yne compounds such as 3-methyl-3-penten-1-yne, 3,5-dimethyl-3-hexen-1-yne, and so forth; alkenyl-containing low molecular weight siloxanes such as tetramethyltetravinylcyclotetrasiloxane, tetramethyltetrahexenylcyclotetrasiloxane, and so forth; and alkyne-containing silanes such as methyltris(3-methyl-1-butyn-3-oxy)silane, vinyltris(3-methyl-1-butyn-3-oxy)silane and so forth.

The quantity of component (F) incorporation is selected as appropriate as a function of the method of using and/or the method of molding the multipackage sponge-forming liquid silicone rubber composition of the present invention. The general quantity of incorporation is in the range from 0.001 mass part to 5 mass parts per 100 mass parts component (A).

A reinforcing finely divided silica powder (G) is preferably also incorporated in order to raise the strength of the silicone rubber sponge formed from the multipackage sponge-forming liquid silicone rubber composition of the present invention. There are no particular limitations on component (G), but fumed silicas and precipitated silicas are suitable. These finely divided silica powders may also have been subjected to a surface treatment with, for example, a chain-form organopolysiloxane, a cyclic organopolysiloxane, hexamethyldisilazane, an organosilane, and so forth. The specific surface area of the reinforcing finely divided silica powder is preferably 50 to 350 m²/g and particularly preferably is 80 to 250 m²/g. The specific surface area can be determined, for example, by the BET adsorption method.

The quantity of component (G) incorporation, expressed per 100 mass parts of component (A), is preferably not more than 20 mass parts, i.e., is from 0 to 20 mass parts, and more preferably is 0 to 15 mass parts and even more preferably is 0 to 10 mass parts.

Those additives heretofore known for incorporation in silicone rubbers may also be incorporated, for example, reinforcing fillers such as fumed titanium oxide and so forth; nonreinforcing fillers such as crushed quartz, crystalline silica, diatomaceous earth, asbestos, aluminosilicate, iron oxide, zinc oxide, calcium carbonate, and so forth; the preceding fillers after surface treatment with an organosilicon compound such as, for example, an organosilane, organopolysiloxane, and so forth; and carbon black such as acetylene black, furnace black, channel black, and so forth. Additives known for silicone rubber compositions may also be incorporated on an optional basis, such as pigments, heat stabilizers, flame retardants, internal release agents, plasticizers, acid acceptors, silicone oils lacking functionality, and so forth. Since it contains water, the silicone rubber composition of the present invention may also incorporate a preservative agent and an antirust agent. The preservative can be exemplified by alkyl para-hydroxybenzoates, benzoic acid, sodium benzoate, sorbic acid, potassium sorbate, phenoxyethanol, benzoic acid, salicylic acid, carbolic acid, sorbic acid, alkyl para-hydroxybenzoates, para-chloro-meta-cresol, hexachlorophene, benzalkonium chloride, chlorhexidine chloride, trichlorocarbanilide, triclosan, photosensitive dyes, thiazoline types, isothiazoline types, biguanide types, triazine types, iodine types, imidazole types, and pyridine types. The thiazoline type preservatives and isothiazoline type preservatives are preferred among the preceding because they exhibit a preservative effect at very low levels of incorporation. The quantity of preservative incorporation is generally 0.001 to 5 mass parts per 100 mass parts of the composition of the present invention.

The multipackage sponge-forming liquid silicone rubber composition of the present invention comprises the previously described components (A) to (F), the optional component (G), and any other optional components, but is characteristically packaged and stored as a plurality of separate compositions. These separately stored compositions are mixed when the silicone rubber sponge is to be formed and are then used in the form of a sponge-forming liquid silicone rubber composition that contains the previously described components (A) to (F), the optional component (G), and any other optional components in the previously described blending ratios. None of this plurality of separately stored compositions may contain both component (A) and component (C), none of this plurality of separately stored compositions may contain both component (B) and component (C), and none of this plurality of separately stored compositions may contain both component (B) and component (E).

When a separately stored composition contains both component (A) and component (C), separation of component (C) during storage then tends to readily occur. In addition, since component (C) separation readily occurs in the case of a composition that contains both component (A) and component (C), this places limits on the quantity of component (C) incorporation with reference to component (A), which has made it quite difficult to obtain, for example, silicone rubber sponge with a density equal to or less than 0.55 $g/cm^3$.

When a separately stored composition contains both component (B) and component (C), the silicon-bonded hydrogen in component (B) can react with component (C) during long-term storage and can thereby be converted into the hydroxyl group; this tends to make the quality of the obtained silicone rubber unstable.

When a separately stored composition contains both component (B) and component (E), the silicon-bonded hydrogen atoms in component (B) may react with each other during storage under the effect of component (E) and, when component (A) is also present, the hydrosilylation reaction between components (A) and (B) may proceed, and the storage stability thus tends to be impaired in either case.

This multipackage sponge-forming liquid silicone rubber composition can be exemplified by a three-package sponge-forming liquid silicone rubber composition comprising (I) a separately stored composition that comprises components (A), (E), and optionally (G), but which does not contain component (B) and does not contain component (C); (II) a separately stored composition that comprises components (A), (B), (D), (F), and optionally (G), but which does not contain component (C) and does not contain component (E); and (III) a separately stored composition that comprises component (C), but which does not contain component (A) and does not contain component (B). The multipackage sponge-forming liquid silicone rubber composition of the present invention can also be exemplified by a three-package sponge-forming liquid silicone rubber composition comprising (I) a separately stored composition that comprises components (A), (E), and optionally (G), but which does not contain component (B) and does not contain component (C); (II) a separately stored composition that comprises components (A), (B), (F), and optionally (G), but which does not contain component (C) and does not contain component (E); and (III) a separately stored composition that comprises components (C) and (D), but which does not contain component (A) and does not contain component (B). The multipackage sponge-forming liquid silicone rubber composition of the present invention can be further exemplified by a three-package sponge-forming liquid silicone rubber composition comprising (I) a separately stored composition that comprises components (A), (D), (E), and optionally (G), but which does not contain component (B) and does not contain component (C); (II) a separately stored composition that comprises components (A), (B), (D), (F), and optionally (G), but which does not contain component (C) and does not contain component (E); and (III) a separately stored composition that comprises component (C), but which does not contain component (A) and does not contain component (B). The multipackage sponge-forming liquid silicone rubber composition of the present invention can be further exemplified by a four-package sponge-forming liquid silicone rubber composition comprising (I) a separately stored composition comprising components (A), (E), and optionally G, but which does not contain component (B), does not contain component (C), and does not contain component (D); (II) a separately stored composition comprising components (A), (B), (F), and optionally (G), but which does not contain component (C), does not contain component (D), and does not contain component (E); (III) a separately stored composition comprising component (C), but which does not contain component (A), does not contain component (B), and does not contain component (D); and (IV) a separately stored composition comprising component (D), but which does not contain component (A), does not contain component (B), and does not contain component (C).

These plurality of separately stored compositions can be produced by mixing the previously described components (A) to (F), the optional component (G), and the additive or additives to homogeneity, in such a manner that none of this plurality of separately stored compositions contain both component (A) and component (C), none of this plurality of separately stored compositions contain both component (B) and component (C), and none of this plurality of separately stored compositions contain both component (B) and component (E). The mixer used here can be exemplified by homomixers, paddle mixers, homodispersers, colloid mills, and vacuum stirrer/mixers, but the mixer is not particularly limited to these. In those instances in which component (G) is incorporated, a silica masterbatch that incorporates component (G) and a portion of component (A) is preferably prepared in advance followed by mixing with the remaining component (A) and the other components.

The method of the present invention for producing a silicone rubber sponge will be described in detail in the following.

The method of the present invention for producing a silicone rubber sponge comprises the following steps 1 to 3. The components (A) to (F) in the following step 1 and the plurality of separately stored compositions in the following step 1 are as described hereinabove.

Step 1: A step of mixing the plurality of separately stored compositions of the multipackage sponge-forming liquid silicone rubber composition to produce a sponge-forming liquid silicone rubber composition comprising at least the following components (A) to (F):
(A) 100 mass parts of an alkenyl-containing polydiorganosiloxane comprising
  (A1) 0 to 90 mass parts of a polydiorganosiloxane that has alkenyl groups on both molecular chain terminals and that does not contain alkenyl groups in the side chains on the molecular chain, and
  (A2) 10 to 100 mass parts of a polydiorganosiloxane that has at least two alkenyl groups in the side chains on the molecular chain;
(B) an organopolysiloxane that has at least two silicon-bonded hydrogen atoms in each molecule, in an amount that provides 0.4 to 20 moles silicon-bonded hydrogen atoms in component (B) per 1 mole of the alkenyl groups in component (A);
(C) 10 to 250 mass parts of a mixture comprising water and an inorganic thickener;
(D) 0.1 to 15 mass parts of an emulsifying agent;
(E) a hydrosilylation reaction catalyst in an amount sufficient to bring about crosslinking of this composition; and
(F) 0.001 to 5 mass parts of a cure retarder.

Step 2: A step of crosslinking and curing the sponge-forming liquid silicone rubber composition obtained in step 1 to obtain a water-containing silicone rubber molding.

Step 3: A step of removing the water from the water-containing silicone rubber molding obtained in step 2 to obtain a silicone rubber sponge.

The aforementioned sponge-forming liquid silicone rubber composition preferably also contains a finely divided silica powder (G) at 0.01 to 20 mass parts per 100 mass parts component (A) in order to improve the strength of the silicone rubber sponge provided by the production method of the present invention. This component (G) is as previously described.

Step 1 in the method of the present invention for producing a silicone rubber sponge can be exemplified by the following: (i) a batch process in which the plurality of separately stored compositions are introduced into a mixing device and mixed to produce the sponge-forming liquid silicone rubber composition, which is held, for example, in a tank; (ii) a continuous process in which the plurality of separately stored compositions are respectively stored in separate containers and are fed to a mixing device by, for example, a metering feed device connected to each container, and are mixed therein and the sponge-forming liquid silicone rubber composition is continuously fed to step 2 in the amount to be subjected to molding; and (iii) a process that combines the aforementioned batch and continuous processes. However, step 1 is not limited to these and can be selected as appropriate in conformity with the type, shape, and size of the desired silicone rubber sponge and the molding method.

In step 1, the sponge-forming liquid silicone rubber may be prepared in a single stage in which the plurality of separately stored compositions are mixed or the sponge-forming liquid silicone rubber may be prepared via a plurality of stages. This preparation of the sponge-forming liquid silicone rubber via a plurality of stages can be exemplified by a procedure in which a mixture is prepared by mixing a plurality of the separately stored compositions and the sponge-forming liquid silicone rubber is then prepared by mixing the remaining separately stored composition or compositions into the thusly prepared mixture; and by a procedure in which a first mixture is prepared by mixing a plurality of the separately stored compositions, a second mixture is prepared by mixing the remaining separately stored compositions, and the sponge-forming liquid silicone rubber is then prepared by mixing the first and second mixtures.

The density of the obtained silicone rubber sponge can be varied as necessary by changing the amount of incorporation of the separately stored composition or compositions that contain(s) component (C).

In a specific example of the (i) batch process for step 1, the plurality of separately stored compositions are introduced into a mixing device equipped with a dispersing mechanism, for example, stirring blades that rotate at 500 to 3000 rpm, and mixing is performed to prepare a pre-set amount of the sponge-forming liquid silicone rubber composition, which is then held, for example, in a tank.

In a specific example of the (ii) continuous process for step 1, the plurality of compositions are respectively stored in separate containers and are fed, by a metering feed apparatus connected to the individual containers, to a mixing device, e.g., a static mixer or a dynamic mixer such as a continuous emulsifying device or a pin mixer, and are therein mixed, and the sponge-forming liquid silicone rubber composition is fed to step 2 in the amount required for molding while the composition is being produced. The mixing device is preferably a dynamic mixer from the standpoint of the time required to disperse component (C). Moreover, a plurality of mixing devices may be employed. For example, a mixture 1, comprising components (A), (C), (D), (E), and optionally (G), but not containing component (B) and not containing component (F), may be prepared with a first mixing device; a mixture 2, comprising components (A), (B), (C), (D), (F), and optionally (G), but not containing component (E), may be prepared with a second mixing device; mixture 1 and mixture 2 may be mixed using a third mixing device that is connected through, for example, a metering feed device, to the first mixing device and the second mixing device; and the thereby prepared sponge-forming liquid silicone rubber composition may be continuously fed to step 2. There are no particular limitations on the metering feed device, and it can be exemplified by a cylinder pump, monopump, gear pump, diaphragm pump, and screw pump. When the containers storing the plurality of compositions are pails or drums, the combination of a metering feed device with an automatic withdrawal device, e.g., a pail pump or a drum pump, is preferably used.

The (iii) combination of batch process and continuous process combination for step 1 can be specifically exemplified by the following. For example, the plurality of compositions are stored, for example, in separate containers and are supplied, by a metering feed device connected to each container, into a mixing device, e.g., a static mixer or a dynamic mixer such as a pin mixer or a continuous emulsifying device, and are therein mixed to prepare a pre-set amount of the sponge-forming liquid silicone rubber composition, which is then held in, for example, a tank and is fed in the required amount to step 2. In another example, the plurality of separately stored compositions are introduced in prescribed quantities into a mixing device equipped with a dispersing mechanism, for example, stirring blades that rotate at 500 to 3000 rpm, to prepare (I) a mixture 1, comprising components (A), (C), (D), (E), and optionally (G), but not containing component (B) and not containing component (F), that is held in, for example, a tank; (II) a mixture 2, comprising components (A), (C), (D), (B), (F), and optionally (G), but not containing component (E), is similarly prepared and held in a tank separate from mixture 1; mixture 1 and mixture 2 are introduced, by a metering feed apparatus connected to these tanks, to a mixing device, e.g., a static mixer or a dynamic mixer such as a pin mixer or a continuous emulsifying device, and are therein mixed to produce a sponge-forming liquid silicone rubber composition, which is continuously fed to step 2.

There are no particular limitations on the method of crosslinking and curing the sponge-forming liquid silicone rubber composition in step 2 of the method of the present invention for producing a silicone rubber sponge, but the sponge-forming liquid silicone rubber composition prepared in step 1 is preferably heated at less than 120° C., preferably at less than 100° C., and particularly preferably at 50 to 90° C. Specific examples are as follows: the sponge-forming liquid silicone rubber composition prepared in step 1 may be introduced into the cavity of the mold that will be used for molding and a water-containing silicone rubber molding may then be molded by holding, with the application of pressure, at a temperature below 100° C. and preferably at a temperature of 50 to 90° C.; the sponge-forming liquid silicone rubber composition prepared in step 1 may be coated on a releasable substrate, for example, a resin film and so forth, and a water-containing silicone rubber molding may be molded by curing, for example, by heating to 50 to 120° C.; the sponge-forming liquid silicone rubber composition prepared in step 1 may be coated on a substrate, for example, a synthetic fiber woven fabric, resin film, metal plate or sheet, glass cloth, and so forth, and a water-containing silicone rubber coating layer may then be formed on the substrate, for example, by heating to 50 to 120° C.; and the sponge-forming liquid silicone rubber composition prepared in step 1 may be ejected from a nozzle and a water-containing silicone rubber molding may then be molded, for example, by introduction into hot water at 80 to 100° C.

There are no particular limitations on the method used to remove the water from the water-containing silicone rubber molding in step 3 of the method of the present invention for producing silicone rubber sponge, but the water is preferably removed by heating the water-containing silicone rubber molding produced in step 2 to 120 to 250° C. It may also be possible to perform steps 2 and 3 at the same time in those instances where the water-containing silicone rubber molding is being continuously formed in step 2 by coating the sponge-forming liquid silicone rubber composition on a substrate, such as a synthetic fiber woven fabric, resin film, metal plate or sheet, or glass cloth, and by forming the water-containing silicone rubber molding on the substrate by the application of, for example, a hot air current, infrared radiation, and so forth. However, in order to also obtain a silicone rubber sponge layer having uniform and microfine-sized cells in such a continuous molding operation, curing (step 2) is preferably performed while maintaining the hydrated state of the sponge-forming liquid silicone rubber composition as much as possible using a temperature less than 120° C. and removal of the water (step 3) from the water-containing silicone rubber molding is then preferably performed with heating to at least 120° C. and preferably at 120 to 250° C.

The silicone rubber sponge of the present invention will now be described.

The silicone rubber sponge of the present invention preferably has a shrinkage rate of not more than 10% from the standpoint of obtaining an excellent mold cavity shape reproducibility for the sponge molding. The shrinkage rate can be determined using the following formula from the length (L1) of a sponge test specimen that has been molded in a mold and the length (L0) of the corresponding mold cavity.

$$\text{shrinkage rate (\%)}=(L0-L1)/L0\times 100$$

The silicone rubber sponge of the present invention preferably exhibits little heat-induced thermal distortion, i.e., thermal expansion, and, from the standpoint of exhibiting an excellent shape recovery, preferably at least 90% of its cells are continuous cells. Here, the determination of whether cells are continuous cells can be made by immersing the silicone rubber sponge in water and replacing the air in the continuous cells with water while under reduced pressure. The proportion of the continuous cells in the total cells in the sponge, that is, the continuous cell fraction, can then be determined from the following formula using 1.0 g/cm$^3$ for the density of water.

$$\text{continuous cell fraction (\%)}=\{(\text{mass of absorbed water})/(\text{cell volume})\}\times 100$$

The cell volume in the preceding formula can be determined from the following formula.

$$\text{cell volume (cm}^3)=\{(\text{mass of the sponge})/(\text{density of the sponge})\}-\{(\text{mass of the sponge})/(\text{density of the rubber})\}$$

The density of the rubber in the preceding formula is the value obtained by measuring the density of the silicone rubber molding obtained by crosslinking and curing a sponge-forming liquid silicone rubber composition prepared in the same manner, but omitting components (C) and (D), and represents the density of the walls of the sponge cells.

In addition, the silicone rubber sponge of the present invention, because it exhibits a low shrinkage rate during molding and an excellent mold cavity shape reproducibility and because it contains microfine-sized and uniform continuous cells, is useful as an elastic material for the fixing members of image-forming devices. In the case of fixing rolls, the silicone rubber sponge of the present invention can be used to form a silicone rubber sponge layer on the core, and in this case the material, dimensions, and so forth, of the core can be selected as appropriate for the type of roll. In the case of a fixing belt, the silicone rubber sponge of the present invention can be used to form a silicone rubber sponge layer on an endless belt, and in this case the material, dimensions, and so forth, of the endless belt can be selected as appropriate for the type of belt.

A fluororesin layer or fluororubber layer may also be disposed on the outer circumference of this silicone rubber sponge layer. In such a case, the fluororesin layer is formed using, for example, a fluororesin coating material or a fluororesin tube, and is formed covering the aforementioned silicone rubber layer. This fluororesin coating material can be exemplified by polytetrafluoroethylene resin (PTFE) latexes, DAIEL latexes (fluorolatexes from Daikin Industries, Ltd.), and so forth. Commercially available products can be used for the fluororesin tube, for example, polytetrafluoroethylene resin (PTFE), tetrafluoroethylene-perfluoroalkyl vinyl ether copolymer resin (PFA), ethylene fluoride-polypropylene copolymer resins (FEP), polyvinylidene fluoride resins (PVDF), polyvinyl fluoride resins, and so forth, among which PFA is particularly preferred.

The thickness of the silicone rubber sponge layer under consideration is selected as appropriate, but, viewed from the perspective of effectively utilizing the rubbery elasticity of the silicone rubber sponge, 0.05 to 80 mm is preferred and 0.1 to 50 mm is particularly preferred. The thickness of the fluororesin or fluororubber layer formed thereon is preferably 5 to 200 μm and more preferably is 10 to 100 μm.

EXAMPLES

The present invention is specifically described by the examples and comparative examples provided below, but the present invention is not limited to these examples. The viscosity in the examples is the value measured at 25° C.

<Density>

The density was measured based on JIS K 6268.

<Hardness (Asker C)>

This was based on the test method specified in JIS K 7312 using a type C hardness tester. A test specimen with a thickness of 6 mm was used.

<Tensile Strength and Elongation>

The tensile strength and elongation were measured based on JIS K 6251.

<Thermal Conductivity>

A 12 mm-thick silicone rubber test specimen for measurement of the thermal conductivity was prepared and the thermal conductivity of this test specimen was measured using a QTM-500 Quick Thermal Conductivity Meter from Kyoto Electronics Manufacturing Co., Ltd.

<Cell Status>

The cross section of the compression set measurement test specimen specified in JIS K 6262 was visually inspected and was evaluated as follows: a uniform cell status across the entire cross section was evaluated as "uniform"; the presence of some excessively large cells was evaluated as "nonuniform"; and an evaluation of "ruptured" was rendered when numerous excessively large cells were seen in the cross section and fissuring was produced at the surface of the test specimen.

<Average Cell Size>

A hardness measurement test specimen was sectioned with a razor blade and the central region was then observed with a scanning electron microscope. To measure the average cell diameter, the cell diameter was measured over a 0.04 mm$^2$ area (cell count=approximately 200 to 300) and the average value (numerical average) was determined. The cell diameter of the largest cell seen during measurement of the average cell diameter was taken to be the maximum cell diameter. When measurement of the cell diameter was compromised because the cells were chained together and numerous flat stratiform pores were seen, the evaluation of "stratiform" was rendered and the average cell diameter and maximum cell diameter were not measured.

<Shrinkage Rate>

Molding was carried out using a mold having a cavity with a length of 70 mm, a width of 50 mm, and a thickness of 6 mm to yield a hardness measurement test specimen; the length of the long direction of this test specimen was measured; and this was substituted in the following formula to determine the shrinkage rate.

shrinkage rate={(70−measured value (mm))/70}×100

<The Continuous Cell Fraction>

The mass and density were measured on a silicone rubber sponge compression set test specimen as specified in JIS K 6262 and the cell volume was determined by substitution in the following formula. The rubber density in the formula is the density of the compression set test specimen produced by crosslinking and curing the silicone rubber composition prepared by the same procedure, but omitting components (C) and (D).

cell volume={(mass of the sponge)/(density of the sponge)}−{(mass of the sponge)/(density of the rubber)}

In addition, the sponge specimen was held in water and water absorption was performed while standing for 3 minutes under a reduced pressure of −750 mmHg; the mass of the absorbed water was weighed; and the continuous cell fraction was determined by substitution into the following formula using 1.0 g/cm$^3$ for the density of water.

continuous cell fraction (%)={(mass of absorbed water)/(cell volume)}×100

<Mold Staining>

The mold was cooled following molding of the previously described test specimen for measurement of the shrinkage rate, after which the interior of the cavity was evaluated by touch to determine the presence/absence of adhered material. An evaluation of "excellent" was rendered when there was no change from prior to molding, while an evaluation of "adhered material was present" was rendered when an oily adhered material was detected.

Preparation Example 1

The following were introduced into a Ross mixer and were mixed to uniformity at room temperature: 100 mass parts of a polydimethylsiloxane having a viscosity of 40,000 mPa·s and endblocked by the dimethylvinylsiloxy group at both molecular chain terminals, 40 mass parts fumed silica having a BET specific surface area of 225 m$^2$/g, 7 mass parts hexamethyldisilazane, 2 mass parts water, and 0.2 mass part of a dimethylsiloxane•methylvinylsiloxane copolymer having a viscosity of 20 mPa·s and a vinyl content of approximately 10.9 mass % and endblocked by the dimethylhydroxysiloxy group at both molecular chain terminals. This was followed by heating for 2 hours at 200° C. under reduced pressure to produce a silica masterbatch that exhibited fluidity.

Preparation Example 2

A composition 1 was produced by mixing the following to homogeneity: 9.4 mass parts of the silica masterbatch prepared in Preparation Example 1; 71.4 mass parts of a dimethylsiloxane•methylvinylsiloxane copolymer having a viscosity of 7,500 mPa·s and a vinyl content of approximately 0.31 mass % and endblocked by the dimethylvinylsiloxy group at both molecular chain terminals; 12 mass parts of a dimethylpolysiloxane having a viscosity of 2,000 mPa·s and a vinyl content of 0.23 mass % and endblocked by the dimethylvinylsiloxy group at both molecular chain terminals; 0.1 mass part of a polypropylene glycol fatty acid ester nonionic surfactant having an HLB of 3.0 (trade name: Kao Homotex SP-200V, from the Kao Corporation); 0.6 mass part of a sorbitan fatty acid ester nonionic surfactant having an HLB of 4.3 (trade name: Rheodol SP-O10V, from the Kao Corporation); 0.4 mass part of a 1,3-divinyltetramethyldisiloxane solution (platinum metal content of about 4,000 ppm) of a platinum complex of 1,3-divinyltetramethyldisiloxane; and 6 mass parts of a mixture of 40 mass parts iron oxide red (trade name: Bayferrox, from Bayer) and 60 mass parts of a dimethylpolysiloxane having a viscosity of 10,000 mPa·s and endblocked by the dimethylvinylsiloxy group at both molecular chain terminals.

Preparation Example 3

A composition 2 was produced by mixing the following to homogeneity: 9.4 mass parts of the silica masterbatch prepared in Preparation Example 1; 57.3 mass parts of a dimethylsiloxane•methylvinylsiloxane copolymer having a viscosity of 7,500 mPa·s and a vinyl content of approximately 0.31 mass % and endblocked by the dimethylvinylsiloxy group at both molecular chain terminals; 12 mass parts of a dimethylpolysiloxane having a viscosity of 2,000 mPa·s and a vinyl content of 0.23 mass % and endblocked by the dimethylvinylsiloxy group at both molecular chain terminals; 13.1 mass parts of a dimethylsiloxane•methylhydrogensiloxane copolymer having a kinematic viscosity of 63 mm$^2$/s and a silicon-bonded hydrogen content of approximately 0.70 mass % and endblocked by the trimethylsiloxy group at both molecular chain terminals; 0.1 mass part of a polypropylene glycol fatty acid ester nonionic surfactant having an HLB of 3.0 (trade name: Kao Homotex SP-200V, from the Kao Corporation); 0.6 mass part of a sorbitan fatty acid ester nonionic surfactant having an HLB of 4.3 (trade name: Rheodol SP-O10V, from the Kao Corporation); 0.03 mass part ethynylcyclohexanol as a cure retarder; and 6 mass parts of a mixture of 40 mass parts iron oxide red (trade name: Bayferrox, from Bayer) and 60 mass parts of a dimethylpolysiloxane having a viscosity of 10,000 mPa·s and endblocked by the dimethylvinylsiloxy group at both molecular chain terminals.

Preparation Example 4

1 mass part smectite clay (hydrophilic purified bentonite composite with an organic polymer, pH 6.5, from the Hojun Co., Ltd.) and 99 mass parts ion-exchanged water were introduced into a homomixer and were mixed to uniformity at room temperature to produce a mixture of water and an inorganic thickener designated as composition (c-1).

Preparation Example 5

1 mass part of a water-soluble polymer (sodium acrylate, from Nacalai Tesque, Inc.) and 99 mass parts ion-exchanged water were introduced into a Disper mixer and were mixed to homogeneity at room temperature to produce a mixture of water and an organic thickener designated as composition (c-2).

Preparation Example 6

3 mass parts of a water-soluble polymer (sodium carboxymethyl cellulose, from Nacalai Tesque, Inc.) and 97 mass parts ion-exchanged water were introduced into a Disper mixer and were mixed to homogeneity at room temperature to produce a mixture of water and an organic thickener designated as composition (c-3).

Preparation Example 7

1 mass part smectite clay (hydrophilic purified bentonite composite with an organic polymer, pH 6.5, from the Hojun Co., Ltd.), 99 mass parts ion-exchanged water, and 0.65 mass part of a sorbitan fatty acid ester nonionic surfactant having an HLB of 4.3 (trade name: Rheodol SP-O10V, from the Kao Corporation) were introduced into a homomixer and were mixed to uniformity at room temperature to produce a mixture of water and an inorganic thickener designated as composition (c-4).

Preparation Example 8

1 mass part smectite clay (hydrophilic purified bentonite composite with an organic polymer, pH 6.5, from Hojun Co., Ltd.), 99 mass parts ion-exchanged water, 0.65 mass part of a sorbitan fatty acid ester nonionic surfactant having an HLB of 4.3 (trade name: Rheodol SP-O10V, from the Kao Corporation), and 0.005 mass part of an isothiazoline-type preservative (10% aqueous solution) were introduced into a homomixer and were mixed to uniformity at room temperature to produce a mixture of water and an inorganic thickener designated as composition (c-5).

Examples 1 to 4

The composition 1 prepared in Preparation Example 2, the composition 2 prepared in Preparation Example 3, and the composition (c-1) prepared in Preparation Example 4 were introduced in the proportions given in Table 1 into a dental mixer and were mixed to uniformity at 25° C. to give a sponge-forming liquid silicone rubber composition. Using a compression molding machine, the obtained sponge-forming liquid silicone rubber composition was crosslinked and cured at 90° C./10 minutes to fabricate the various test specimens in a water-containing state. These test specimens were then held in an open system at 200° C. for 4 hours to remove the water in the test specimens and thereby provide silicone rubber sponge test specimens. The density, hardness, tensile strength, elongation, thermal conductivity, shrinkage rate, and continuous cell fraction were measured using these silicone rubber sponge test specimens. The results are reported in Table 1.

Example 5

Composition 3 and composition 4 were each prepared as in Preparation Example 2 and Preparation Example 3, but in this case without incorporating the 0.1 mass part polypropylene glycol fatty acid ester nonionic surfactant having an HLB of 3.0 (trade name: Kao Homotex SP-200V, from the Kao Corporation) and 0.6 mass part sorbitan fatty acid ester nonionic surfactant having an HLB of 4.3 (trade name: Rheodol SP-O10V, from the Kao Corporation). Composition 3, composition 4, and the composition (c-4) prepared in Preparation Example 7 were held in separate containers, and a sponge-forming liquid silicone rubber composition was continuously prepared by feeding compositions 3, 4, and (c-4), using a metering feed apparatus connected to each container, to a pin mixer in the proportions given in Table 1 and mixing at 25° C. Using a compression molding machine, the obtained sponge-forming liquid silicone rubber composition was crosslinked and cured at 90° C./10 minutes to fabricate the various test specimens in a water-containing state. These test specimens were then held in an open system at 200° C. for 4 hours to remove the water in the test specimens and thereby provide silicone rubber sponge test specimens. The density, hardness, tensile strength, elongation, thermal conductivity, shrinkage rate, and continuous cell fraction were measured using these silicone rubber sponge test specimens. The results are reported in Table 1.

TABLE 1

|  |  | Example 1 | Example 2 | Example 3 | Example 4 | Example 5 |
|---|---|---|---|---|---|---|
| composition 1 |  | 50 | 50 | 50 | 50 |  |
| composition 2 |  | 50 | 50 | 50 | 50 |  |
| composition 3 |  |  |  |  |  | 50 |
| composition 4 |  |  |  |  |  | 50 |
| composition (c-1) |  | 76 | 94 | 113 | 132 |  |
| composition (c-4) |  |  |  |  |  | 113 |
| density | (g/cm$^3$) | 0.63 | 0.57 | 0.52 | 0.47 | 0.52 |
| hardness (6 mm) | (Asker C) | 32 | 26 | 21 | 20 | 21 |
| tensile strength | (MPa) | 0.5 | 0.6 | 0.4 | 0.3 | 0.4 |
| elongation | (%) | 88 | 100 | 92 | 73 | 92 |
| thermal conductivity | (W/mk) | 0.115 | 0.105 | 0.099 | 0.091 | 0.099 |
| cell status |  | uniform | uniform | uniform | uniform | uniform |
| average cell size | (μm) | 13 | 13 | 13 | 13 | 13 |
| maximum cell size | (μm) | 27 | 29 | 35 | 31 | 29 |
| shrinkage rate | (%) | 2.0 | 2.2 | 2.9 | 3.7 | 2.3 |
| continuous cell fraction | (%) | 100 | 100 | 100 | 100 | 100 |
| mold staining |  | excellent | excellent | excellent | excellent | excellent |

Example 6

A composition 5 was produced by mixing the following to homogeneity: 9.4 mass parts of the silica masterbatch prepared in Preparation Example 1; 71.4 mass parts of a dimethylsiloxane•methylvinylsiloxane copolymer having a viscosity of 7,500 mPa·s and a vinyl content of approximately 0.31 mass % and endblocked by the dimethylvinylsiloxy group at both molecular chain terminals; 12 mass parts of a dimethylpolysiloxane having a viscosity of 2,000 mPa·s and a vinyl content of 0.23 mass % and endblocked by the dimethylvinylsiloxy group at both molecular chain terminals; 0.8 mass part of a finely particulate platinum catalyst having an average particle size of 1 μm and comprising a thermoplastic silicone resin that had a softening point of 85° C. and that contained 0.4 mass %, as platinum metal atoms, of a 1,1,3,3-tetramethyl-1,3-divinyldisiloxane complex of platinum; and 6 mass parts of a mixture of 40 mass parts iron oxide red (trade name: Bayferrox, from Bayer) and 60 mass parts of a dimethylpolysiloxane having a viscosity of 10,000 mPa·s and endblocked by the dimethylvinylsiloxy group at both molecular chain terminals.

A composition 6 was produced by mixing the following to homogeneity: 9.4 mass parts of the silica masterbatch prepared in Preparation Example 1; 57.3 mass parts of a dimethylsiloxane•methylvinylsiloxane copolymer having a viscosity of 7,500 mPa·s and a vinyl content of approximately 0.31 mass % and endblocked by the dimethylvinylsiloxy group at both molecular chain terminals; 12 mass parts of a dimethylpolysiloxane having a viscosity of 2,000 mPa·s and a vinyl content of 0.23 mass % and endblocked by the dimethylvinylsiloxy group at both molecular chain terminals; 13.1 mass parts of a dimethylsiloxane• methylhydrogensiloxane copolymer having a kinematic viscosity of 63 mm$^2$/s and a silicon-bonded hydrogen content of approximately 0.70 mass % and endblocked by the trimethylsiloxy group at both molecular chain terminals; 1.2 mass parts of a sorbitan fatty acid ester nonionic surfactant having an HLB of 4.3 (trade name: Rheodol SP-O10V, from the Kao Corporation); 0.03 mass part ethynylcyclohexanol as a cure retarder; and 6 mass parts of a mixture of 40 mass parts iron oxide red (trade name: Bayferrox, from Bayer) and 60 mass parts of a dimethylpolysiloxane having a viscosity of 10,000 mPa·s and endblocked by the dimethylvinylsiloxy group at both molecular chain terminals.

Composition 5, composition 6, and the composition (c-1) prepared in Preparation Example 4 were held in separate containers, and a sponge-forming liquid silicone rubber composition was continuously prepared by feeding compositions (c-1), 5, and 6, using a metering feed apparatus connected to each container, to a pin mixer in the proportions given in Table 2 and mixing at 25° C. The individual compositions were fed to the pin mixer in the sequence of composition (c-1), 6, and 5 considered from the side of the mixing shaft driving device at the end opposite the output port of the pin mixer.

Using a compression molding machine, the obtained sponge-forming liquid silicone rubber composition was crosslinked and cured at 90° C./10 minutes to fabricate the various test specimens in a water-containing state. These test specimens were then held in an open system at 200° C. for 4 hours to remove the water in the test specimens and thereby provide silicone rubber sponge test specimens. The density, hardness, tensile strength, elongation, thermal conductivity, shrinkage rate, and continuous cell fraction were measured using these silicone rubber sponge test specimens. The results are reported in Table 2.

Example 7

A composition 7 was prepared as for the composition 6 prepared in Example 6, but without incorporating the 1.2 mass parts sorbitan fatty acid ester nonionic surfactant having an HLB of 4.3 (trade name: Rheodol SP-O10V, from the Kao Corporation).

Composition 7, the composition 5 prepared in Example 6, and the composition (c-5) prepared in Preparation Example 8 were held in separate containers, and a sponge-forming liquid silicone rubber composition was continuously prepared by feeding compositions (c-5), 7, and 5, using a metering feed apparatus connected to each container, to a pin mixer in the proportions given in Table 2 and mixing at 25° C. The individual compositions were fed to the pin mixer in the sequence of composition (c-5), 7, and 5 considered from the side of the mixing shaft driving device at the end opposite the output port of the pin mixer.

Using a compression molding machine, the obtained sponge-forming liquid silicone rubber composition was crosslinked and cured at 90° C./10 minutes to fabricate the various test specimens in a water-containing state. These test specimens were then held in an open system at 200° C. for 4 hours to remove the water in the test specimens and thereby provide silicone rubber sponge test specimens. The density, hardness, tensile strength, elongation, thermal conductivity, shrinkage rate, and continuous cell fraction were measured using these silicone rubber sponge test specimens. The results are reported in Table 2.

TABLE 2

|  |  | Example 6 | Example 7 |
|---|---|---|---|
| composition 5 |  | 50 | 50 |
| composition 6 |  | 50 |  |
| composition 7 |  |  | 50 |
| composition (c-1) |  | 100 |  |
| composition (c-5) |  |  | 100 |
| density | (g/cm$^3$) | 0.55 | 0.55 |
| hardness (6 mm) | (Asker C) | 24 | 24 |
| tensile strength | (MPa) | 0.4 | 0.4 |
| elongation | (%) | 95 | 95 |
| thermal conductivity | (W/mk) | 0.099 | 0.099 |
| cell status |  | uniform | uniform |
| average cell size | (μm) | 13 | 13 |
| maximum cell size | (μm) | 29 | 29 |
| shrinkage rate | (%) | 2.3 | 2.3 |
| continuous cell fraction | (%) | 100 | 100 |
| mold staining |  | excellent | excellent |

Comparative Examples 1 to 3

The silica masterbatch, component (A), component (C), component (D), and the other starting materials were introduced in the proportions given in Table 1 into a Homo Mixer (from Tokushu Kika Kogyo Co., Ltd.) and were mixed to uniformity at 25° C. Into the obtained mixture were then incorporated components (B), (E), and (F), and a sponge-forming liquid silicone rubber composition was subsequently obtained by degassing. Using a compression molding machine, the obtained sponge-forming liquid silicone rubber composition was crosslinked and cured at 90° C./10 minutes to fabricate the various test specimens in a water-containing state. These test specimens were then held in an open system at 200° C. for 4 hours to remove the water in the test specimens and thereby provide silicone rubber sponge test specimens. The density, hardness, tensile strength, elongation, shrinkage rate, and continuous cell fraction were measured using these silicone rubber sponge test specimens. The results are reported in Table 3.

The entries in Table 3 are described below
The Silica Masterbatch
This was the silica masterbatch prepared in Preparation Example 1. The fumed silica content was approximately 27 mass %.
[Component A]
Component A-1
a-1: dimethylpolysiloxane having a viscosity of 2,000 mPa·s and endblocked by dimethylvinylsiloxy at both molecular chain terminals; vinyl group content=0.23 mass %.
[Component B]
b-1: dimethylsiloxane•methylhydrogensiloxane copolymer having a kinematic viscosity of 5.0 mm$^2$/s and endblocked by the trimethylsiloxy group at both molecular chain terminals; silicon-bonded hydrogen content=approximately 0.74 mass %.
[Component C]
c-1: the mixture of water and an inorganic thickener produced in Preparation Example 4; smectite clay content=1.0 mass %.
c-2: the mixture of water and an organic thickener produced in Preparation Example 5; sodium acrylate content=1.0 mass %.
c-3: the mixture of water and an organic thickener produced in Preparation Example 6; sodium carboxymethyl cellulose content=3.0 mass %.
[Component D]
d-1: sorbitan fatty acid ester nonionic surfactant (trade name: Rheodol SP-O10V, from the Kao Corporation); HLB=4.3.
d-2: sorbitan fatty acid ester nonionic surfactant (trade name: Rheodol SP-O30V, from the Kao Corporation); HLB=1.8.
d-3: polypropylene glycol fatty acid ester nonionic surfactant (trade name: Kao Homotex SP-200V, from the Kao Corporation); HLB=3.0.
d-4: polyoxyethylene fatty acid ester nonionic surfactant (trade name: Ionet DL-200, from Sanyo Chemical Industries, Ltd.); HLB=6.6.

TABLE 3

|  |  |  | Comparative Ex. 1 | Comparative Ex. 2 | Comparative Ex. 3 |
|---|---|---|---|---|---|
|  | silica masterbatch |  | 40 | 50 | 40 |
| A | A1 | a-1 | 60 | 50 | 60 |
| B |  | b-1 | 1.06 | 1.43 | 1.66 |
| C | composition | c-1 | 100 |  |  |
|  | composition | c-2 |  | 50 | 50 |
|  | composition | c-3 |  | 50 | 50 |
| D |  | d-1 | 0.3 |  |  |
|  |  | d-2 | 0.7 |  |  |
|  |  | d-3 |  | 3 | 3 |
|  |  | d-4 |  | 1 | 1 |
| E | hydrosilylation catalyst |  | 0.25 | 0.25 | 0.25 |
| F | cure retarder |  | 0.05 | 0.04 | 0.10 |
|  | pigment masterbatch |  | 0.1 | 0.3 | 0.3 |
| density | (g/cm$^3$) |  | 0.67 | 0.62 | 0.76 |
| hardness 6 mm | (Asker C) |  | 27 | 18 | 18 |
| tensile strength | (MPa) |  | 0.4 | 0.7 | 0.2 |
| elongation | (%) |  | 150 | 300 | 100 |
| cell status |  |  | nonuniform | nonuniform | nonuniform |
| average cell size | (μm) |  | stratiform | 30 | 30 |
| maximum cell size | (μm) |  | — | 150 | 100 |
| shrinkage rate | (%) |  | 16.7 | 4.5 | 4.5 |
| continuous cell fraction | (%) |  | 40 | 100 | 76 |
| mold staining |  |  | excellent | adhered material was present | adhered material was present | d-5: polyoxyethylene fatty acid ester nonionic surfactant (trade name: Ionet DO-600, from Sanyo Chemical Industries, Ltd.); HLB=10.4.

[Component E]

platinum catalyst: 1,3-divinyltetramethyldisiloxane solution of a platinum complex of 1,3-divinyltetramethyldisiloxane; platinum metal content of approximately 4,000 ppm.

[Component F]

cure retarder: ethynylcyclohexanol

[Pigment Masterbatch]

Mixture of 40 mass parts iron oxide red (trade name: Bayferrox, from Bayer) and 60 mass parts of a dimethylpolysiloxane having a viscosity of 10,000 mP·s and endblocked by the dimethylvinylsiloxy group at both molecular chain terminals.

INDUSTRIAL APPLICABILITY

The hereinabove-described silicone rubber composition of the present invention, because it exhibits an excellent moldability and is converted by molding into a silicone rubber sponge that has microfine-sized, uniform, and continuous cells, is well suited for application as a sponge for use at elevated temperatures, for example, as the elastic material in the rolls and belts used in image-forming devices such as electronic photocopiers, laser printers, on-demand printers, facsimile devices, and so forth, and also as a heat-insulating material, sound-insulating material, cushioning, packing, gasket, pad, and so forth. The rolls and belts can be exemplified by developing rolls, pressure rolls, and heat rolls. Particularly in the case of image-forming devices such as electronic copiers, laser printers, on-demand printers, facsimile devices, and so forth, the silicone rubber composition of the present invention is very suitably used in the fixing members used in the fixing section where the toner image transferred onto the transfer material, e.g., transfer paper, is fixed by the application of heat and pressure, and is particularly suitABLE FOR USE IN FIXING ROLLS AND BELTS.

DESCRIPTION OF THE REFERENCE SYMBOLS

Figure 1:
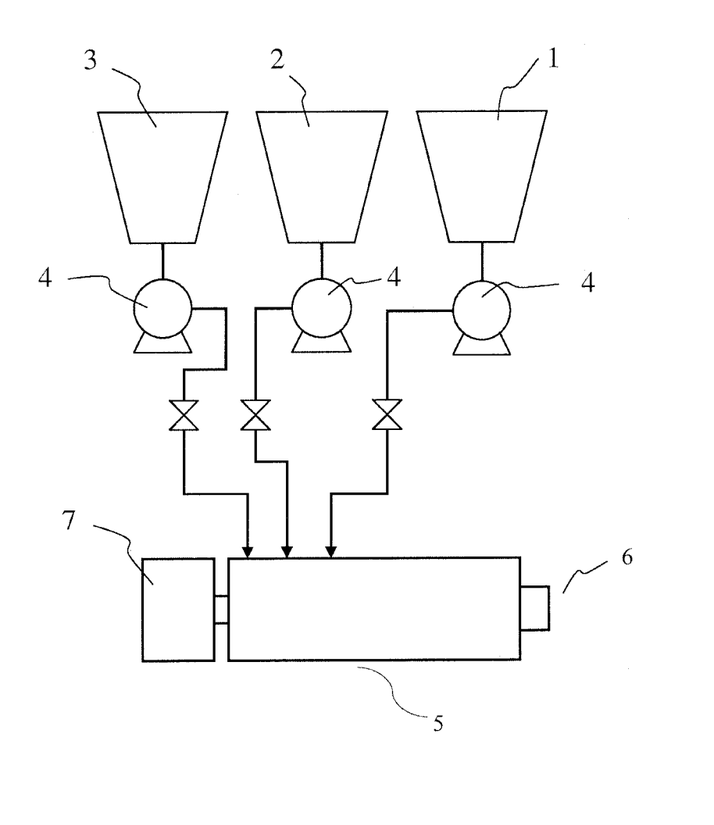
FIG. 1 is a schematic diagram of a preferred embodiment of the method of producing a sponge-forming liquid silicone rubber composition by mixing the plurality of separately stored compositions of the multipackage sponge-forming liquid silicone rubber composition of the present invention.

1: container for a first separately stored composition
2: container for a second separately stored composition
3: container for a third separately stored composition
4: metering feed apparatus
5: dynamic mixer
6: output port
7: mixing shaft driving device

The invention claimed is:

1. A method of producing a silicone rubber sponge, the method comprising:
(1a) providing the following components (A)-(F):
(A) 100 mass parts of an alkenyl-containing polydiorganosiloxane comprising
(A1) 0 to 90 mass parts of a polydiorganosiloxane that has alkenyl groups on both molecular chain terminals and that does not contain alkenyl groups in the side chains on the molecular chain, and
(A2) 10 to 100 mass parts of a polydiorganosiloxane that has at least two alkenyl groups in the side chains on the molecular chain;
(B) an organopolysiloxane that has at least two silicon-bonded hydrogen atoms in each molecule, in an amount that provides 0.4 to 20 moles silicon-bonded hydrogen atoms in component (B) per 1 mole of the alkenyl groups in component (A);
(C) 10 to 250 mass parts of a mixture comprising water and an inorganic thickener;
(D) 0.1 to 15 mass parts of an emulsifying agent;
(E) a hydrosilylation reaction catalyst in an amount sufficient to bring about crosslinking of this composition; and
(F) 0.001 to 5 mass parts of a cure retarder;
(1b) mixing at least two of the components (A)-(F) to form a first separately stored composition, wherein:
the first separately stored composition does not include both of components (A) and (C),
the first separately stored composition does not include both of components (B) and (C), and
the first separately stored composition does not include both of components (B) and (E);
(1c) subsequently mixing the remainder of components (A)-(F) not included in step (1b) with the first separately stored composition of step (1b) to produce a sponge-forming liquid silicone rubber composition;
(2) crosslinking and curing the sponge-forming liquid silicone rubber composition obtained in step (1c) to obtain a water-containing silicone rubber molding; and
(3) removing the water from the water-containing silicone rubber molding obtained in step (2) to obtain the silicone rubber sponge.

2. The method according to claim 1 of producing a silicone rubber sponge, wherein step (1a) further comprises:
providing component (G):
(G) a finely divided silica powder at from 0.01 to 20 mass parts per 100 mass parts component (A);
wherein step (1c) comprises subsequently mixing the remainder of components (A)-(F) not included in step (1b) with the first separately stored composition of step (1b) and with component (G) to produce a sponge-forming liquid silicone rubber composition.

3. A silicone rubber sponge obtained by a production method according to claim 1.

4. The silicone rubber sponge according to claim 3 as an elastic material in a fixing member of an image-forming apparatus.

5. The silicone rubber sponge according to claim 4, characterized in that the fixing member of the image-forming apparatus is a roller or belt.

6. The method according to claim 1, wherein each of the components (A)-(F) in step (1c) are mixed to homogeneity to produce a sponge-forming liquid silicone rubber composition.

7. A method of producing a silicone rubber sponge, the method comprising:
(1) providing the following components (A) to (G):
(A) 100 mass parts of an alkenyl-containing polydiorganosiloxane comprising:
(A1) 0 to 90 mass parts of a polydiorganosiloxane that has alkenyl groups on both molecular chain terminals and that does not contain alkenyl groups in the side chains on the molecular chain, and
(A2) 10 to 100 mass parts of a polydiorganosiloxane that has at least two alkenyl groups in the side chains on the molecular chain;
(B) an organopolysiloxane that has at least two silicon-bonded hydrogen atoms in each molecule, in an amount that provides 0.4 to 20 moles silicon-bonded hydrogen atoms in component (B) per 1 mole of the alkenyl groups in component (A);
(C) 10 to 250 mass parts of a mixture comprising water and an inorganic thickener;
(D) 0.1 to 15 mass parts of an emulsifying agent;

(E) a hydrosilylation reaction catalyst in an amount sufficient to bring about crosslinking of this composition; and
(F) 0.001 to 5 mass parts of a cure retarder; and
(G) a finely dispersed silica powder at from 0.01 to 20 mass parts per 100 mass parts component (A);
(2) mixing components (A), (E), and (G) to form a first composition;
(3) mixing components (A), (B), (D), (F), and (G) to form a second composition;
(4) subsequently mixing component (C) with the formed first composition and the formed second composition to produce a sponge-forming liquid silicone rubber composition comprising the components (A) to (G);
(5) crosslinking and curing the sponge-forming liquid silicone rubber composition obtained in step (4) to obtain a water-containing silicone rubber molding; and
(6) removing the water from the water-containing silicone rubber molding obtained in step (5) to obtain the silicone rubber sponge.

8. A method of producing a silicone rubber sponge, the method comprising:
(1) providing the following components (A) to (G):
(A) 100 mass parts of an alkenyl-containing polydiorganosiloxane comprising:
(A1) 0 to 90 mass parts of a polydiorganosiloxane that has alkenyl groups on both molecular chain terminals and that does not contain alkenyl groups in the side chains on the molecular chain, and
(A2) 10 to 100 mass parts of a polydiorganosiloxane that has at least two alkenyl groups in the side chains on the molecular chain;
(B) an organopolysiloxane that has at least two silicon-bonded hydrogen atoms in each molecule, in an amount that provides 0.4 to 20 moles silicon-bonded hydrogen atoms in component (B) per 1 mole of the alkenyl groups in component (A);
(C) 10 to 250 mass parts of a mixture comprising water and an inorganic thickener;
(D) 0.1 to 15 mass parts of an emulsifying agent;
(E) a hydrosilylation reaction catalyst in an amount sufficient to bring about crosslinking of this composition; and
(F) 0.001 to 5 mass parts of a cure retarder; and
(G) a finely dispersed silica powder at from 0.01 to 20 mass parts per 100 mass parts component (A);
(2) mixing components (A), (E), and (G) to form a first composition;
(3) mixing components (A), (B), (F), and (G) to form a second composition;
(4) mixing components (C) and (D) to form a third composition;
(5) subsequently mixing the formed third composition with the formed first composition and the formed second composition to produce a sponge-forming liquid silicone rubber composition comprising the components (A) to (G);
(6) crosslinking and curing the sponge-forming liquid silicone rubber composition obtained in step (5) to obtain a water-containing silicone rubber molding; and
(7) removing the water from the water-containing silicone rubber molding obtained in step (6) to obtain the silicone rubber sponge.

9. A method of producing a silicone rubber sponge, the method comprising:
(1) providing the following components (A) to (G):
(A) 100 mass parts of an alkenyl-containing polydiorganosiloxane comprising:
(A1) 0 to 90 mass parts of a polydiorganosiloxane that has alkenyl groups on both molecular chain terminals and that does not contain alkenyl groups in the side chains on the molecular chain, and
(A2) 10 to 100 mass parts of a polydiorganosiloxane that has at least two alkenyl groups in the side chains on the molecular chain;
(B) an organopolysiloxane that has at least two silicon-bonded hydrogen atoms in each molecule, in an amount that provides 0.4 to 20 moles silicon-bonded hydrogen atoms in component (B) per 1 mole of the alkenyl groups in component (A);
(C) 10 to 250 mass parts of a mixture comprising water and an inorganic thickener;
(D) 0.1 to 15 mass parts of an emulsifying agent;
(E) a hydrosilylation reaction catalyst in an amount sufficient to bring about crosslinking of this composition; and
(F) 0.001 to 5 mass parts of a cure retarder; and
(G) a finely dispersed silica powder at from 0.01 to 20 mass parts per 100 mass parts component (A);
(2) mixing components (A), (D), (E), and (G) to form a first composition;
(3) mixing components (A), (B), (D), (F), and (G) to form a second composition;
(4) subsequently mixing component (C) with the formed first composition and the formed second composition to produce a sponge-forming liquid silicone rubber composition comprising the components (A) to (G);
(5) crosslinking and curing the sponge-forming liquid silicone rubber composition obtained in step (4) to obtain a water-containing silicone rubber molding; and
(6) removing the water from the water-containing silicone rubber molding obtained in step (5) to obtain the silicone rubber sponge.

* * * * *